United States Patent
Ansamaa et al.

(10) Patent No.: US 9,912,559 B2
(45) Date of Patent: Mar. 6, 2018

(54) METHOD AND APPARATUS FOR LOAD-BALANCING GATEWAY ELEMENTS

(71) Applicant: NOKIA SOLUTIONS AND NETWORKS OY, Espoo (FI)

(72) Inventors: Jarkko Henrikki Ansamaa, Espoo (FI); Tommy Johannes Lindgren, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 192 days.

(21) Appl. No.: 14/893,682

(22) PCT Filed: May 24, 2013

(86) PCT No.: PCT/EP2013/060768
§ 371 (c)(1),
(2) Date: Nov. 24, 2015

(87) PCT Pub. No.: WO2014/187504
PCT Pub. Date: Nov. 27, 2014

(65) Prior Publication Data
US 2016/0119206 A1    Apr. 28, 2016

(51) Int. Cl.
*H04L 12/26* (2006.01)
*H04W 76/06* (2009.01)
(Continued)

(52) U.S. Cl.
CPC .............. *H04L 43/08* (2013.01); *H04L 43/16* (2013.01); *H04W 24/04* (2013.01);
(Continued)

(58) Field of Classification Search
CPC ....... H04L 47/125; H04L 43/08; H04L 43/16; H04W 24/04; H04W 76/064; H04W 76/068; H04W 28/0289
See application file for complete search history.

(56) References Cited

U.S. PATENT DOCUMENTS

2003/0156537 A1    8/2003  Soulhi et al.
2010/0144363 A1*   6/2010  De Rosa ........... H04W 72/0486
                                                       455/452.1
(Continued)

FOREIGN PATENT DOCUMENTS

EP         1 817 932 A1    8/2007
WO    WO 2006/059932 A1    6/2006

OTHER PUBLICATIONS

International Search Report & Written Opinion dated Apr. 10, 2014 corresponding to International Patent Application No. PCT/EP2013/060768.
(Continued)

*Primary Examiner* — Min Jung
(74) *Attorney, Agent, or Firm* — Squire Patton Boggs (US) LLP

(57) ABSTRACT

A method, apparatus, or computer program relates to load balancing between a plurality of gateway elements in a communication system. In particular, the method can include determining in one gateway element that a network load level in the one gateway element has changed. The method may also include deactivating, at the one gateway element, at least one inactive user session when the network load level is above a threshold of the network load level.

19 Claims, 9 Drawing Sheets

(51) Int. Cl.
*H04W 24/04* (2009.01)
*H04W 28/02* (2009.01)

(52) U.S. Cl.
CPC ...... *H04W 76/064* (2013.01); *H04W 28/0289* (2013.01); *H04W 76/068* (2013.01)

(56) References Cited

U.S. PATENT DOCUMENTS

2012/0124196 A1* 5/2012 Brisebois ............ H04W 76/046
709/224
2013/0130693 A1* 5/2013 Salvador ............... H04W 48/20
455/437

OTHER PUBLICATIONS

Nortel Networks, "Three Critical left-over scenarios of lu-Flex," 3GPP Draft; R3-051240, TSG-RAN Working Group 3#49, Seoul, Korea, Nov. 3, 2005, XP050158731, pp. 1-3.

* cited by examiner

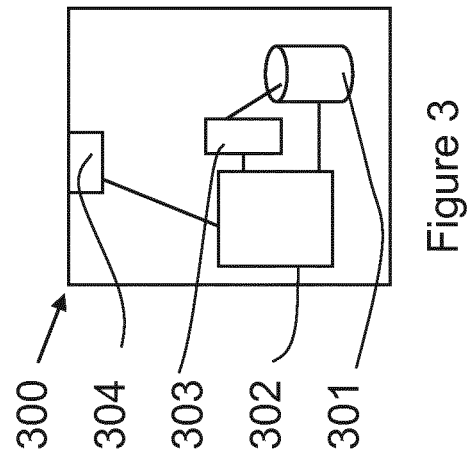
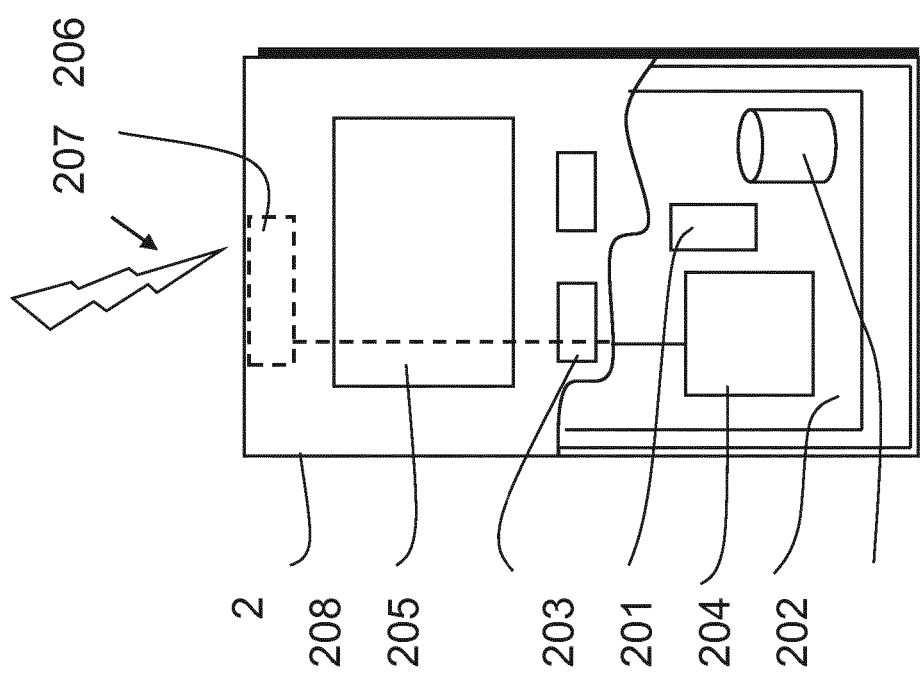

METHOD AND APPARATUS FOR LOAD-BALANCING GATEWAY ELEMENTS

FIELD OF THE DISCLOSURE

This disclosure relates to methods, apparatus and computer programs and in particular but not exclusively to methods, apparatus and computer programs for use in or with elements such as gateways.

BACKGROUND OF THE DISCLOSURE

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment.

The UE or terminal has user sessions established as tunnels between the UE and a gateway. The gateway provides access to service networks, the Internet or the like.

SUMMARY OF THE DISCLOSURE

According to an aspect, there is provided a method comprising: determining in an element that a load level in the element has changed; and deactivating at least one inactive session when a load level is above a load level threshold.

The method may comprise determining if the load level exceeds a load level trigger.

A plurality of load level triggers may be provided.

The method may comprise determining which of a plurality of sessions are inactive.

The determining which of a plurality of sessions are inactive may comprise determining that a session is inactive if the session has been inactive for longer than a given time.

The given time may be dependent on the load level in the element.

The given time may be dependent on the higher or highest of the load level triggers which has been exceeded.

The deactivating may comprise deactivating the inactive sessions at a rate which is dependent on the load level.

The rate of deactivating the inactive sessions may be dependent on the higher or highest of the load level triggers which has been exceeded.

The method may be performed in the element.

The element may comprise a gateway.

The element may comprise a virtual gateway.

According to another aspect, there is provided an apparatus comprising at least one processor and at least one memory including computer code for one or more programs, the at least one memory and the computer code configured, with the at least one processor, to cause the apparatus at least to: determine in an element that a load level in the element has changed; and deactivate at least one inactive session when a load level is above a load level threshold.

The at least one memory and the computer code may be configured, with the at least one processor, to cause the apparatus to determine if the load level exceeds a load level trigger.

A plurality of load level triggers may be provided.

The at least one memory and the computer code may be configured, with the at least one processor, to cause the apparatus to determine which of a plurality of sessions are inactive.

The at least one memory and the computer code may be configured, with the at least one processor, to cause the apparatus to determine that a session is inactive if the session has been inactive for longer than a given time.

The given time may be dependent on the load level in the element.

The given time may be dependent on the higher or highest of the load level triggers which have been exceeded.

The at least one memory and the computer code may be configured, with the at least one processor, to cause the apparatus to deactivate the inactive sessions at a rate which is dependent on the load level.

The rate of deactivating the inactive sessions may be dependent on the higher or highest of the load level triggers which has been exceeded According to another aspect, there is provided an apparatus comprising: means for determining in an element that a load level in the element has changed; and means for deactivating at least one inactive session when a load level is above a load level threshold.

The determining means may be for determining if the load level exceeds a load level trigger.

A plurality of load level triggers may be provided.

The determining means may be for determining which of a plurality of sessions are inactive.

The determining means may be for determining that a session is inactive if the session has been inactive for longer than a given time.

The given time may be dependent on the load level in the element.

The given time may be dependent on the higher or highest of the load level triggers which has been exceeded.

The deactivating means may be for deactivating the inactive sessions at a rate which is dependent on the load level.

The rate of deactivating the inactive sessions may be dependent on the higher or highest of the load level triggers which has been exceeded An element may comprise any of the above apparatus.

The element may be a gateway or a virtual gateway.

In the above, many different embodiments have been described. It should be appreciated that further embodiments may be provided by the combination of any two or more of the embodiments described above.

A computer program comprising program code means adapted to perform the methods may also be provided.

Various other aspects and further embodiments are also described in the following detailed description and in the attached claims.

DESCRIPTION OF THE FIGURES OF THE DISCLOSURE

Some embodiments will now be described, by way of example only, with reference to the accompanying figures in which:

FIG. 2 shows a schematic diagram of a mobile communication device according to some embodiments;

FIG. 3 shows a schematic diagram of a control apparatus according to some embodiments;

Figure 4:
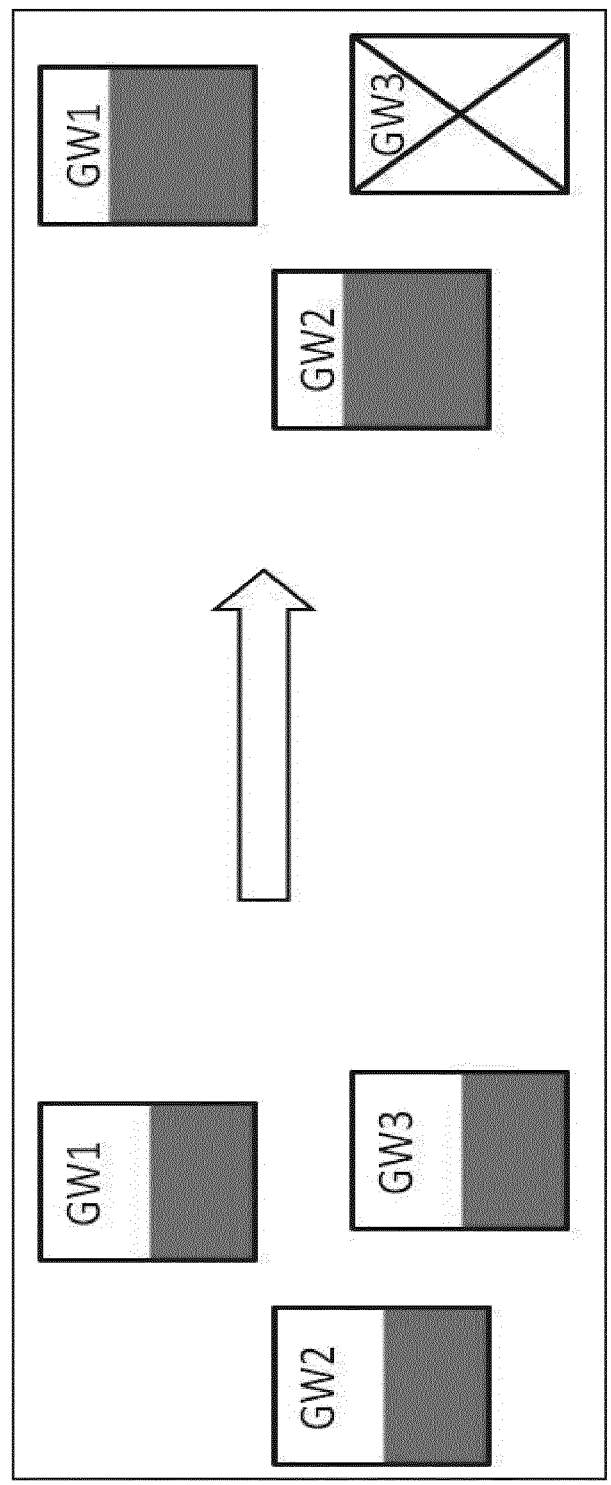
Figure 5:
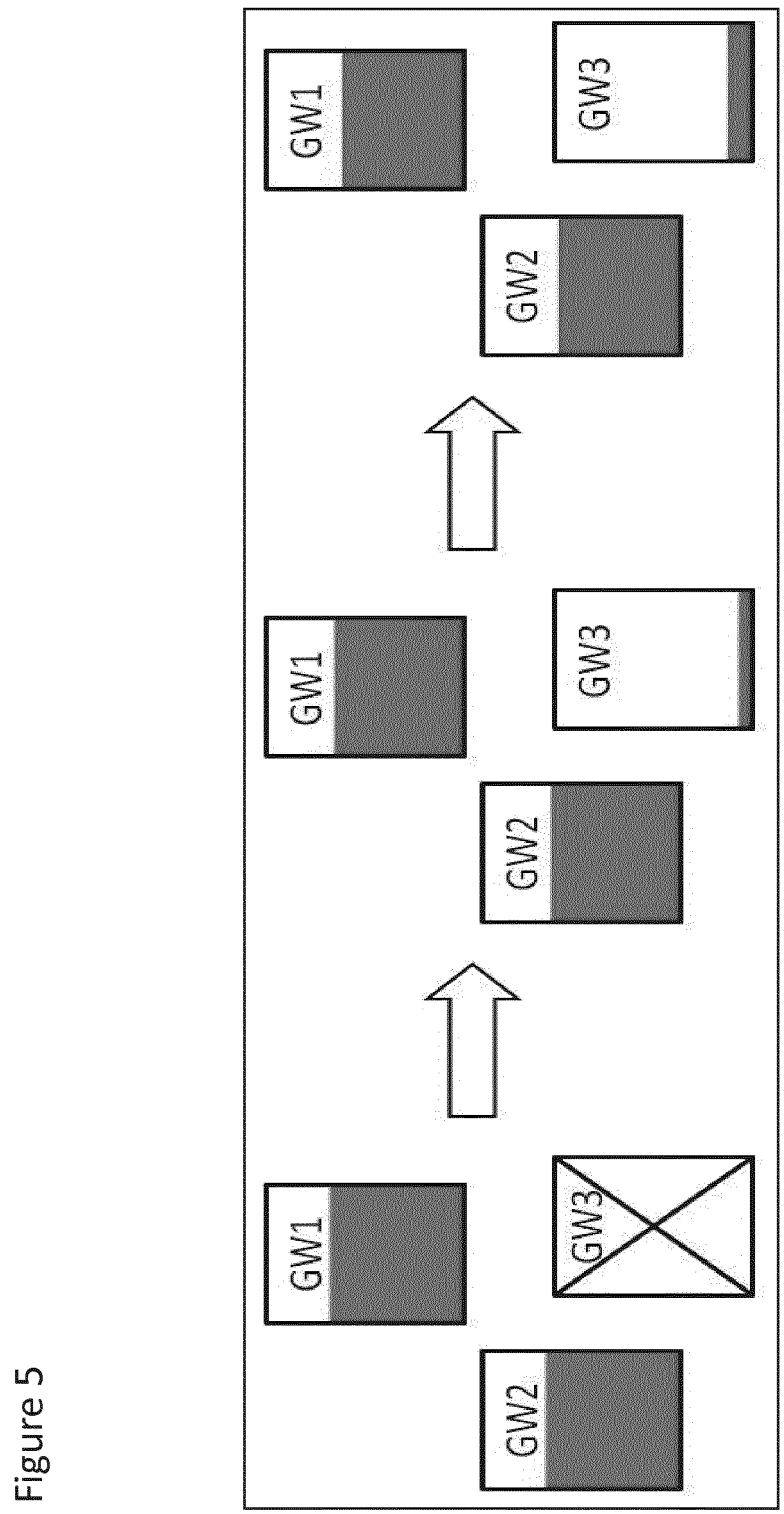
Figure 6:
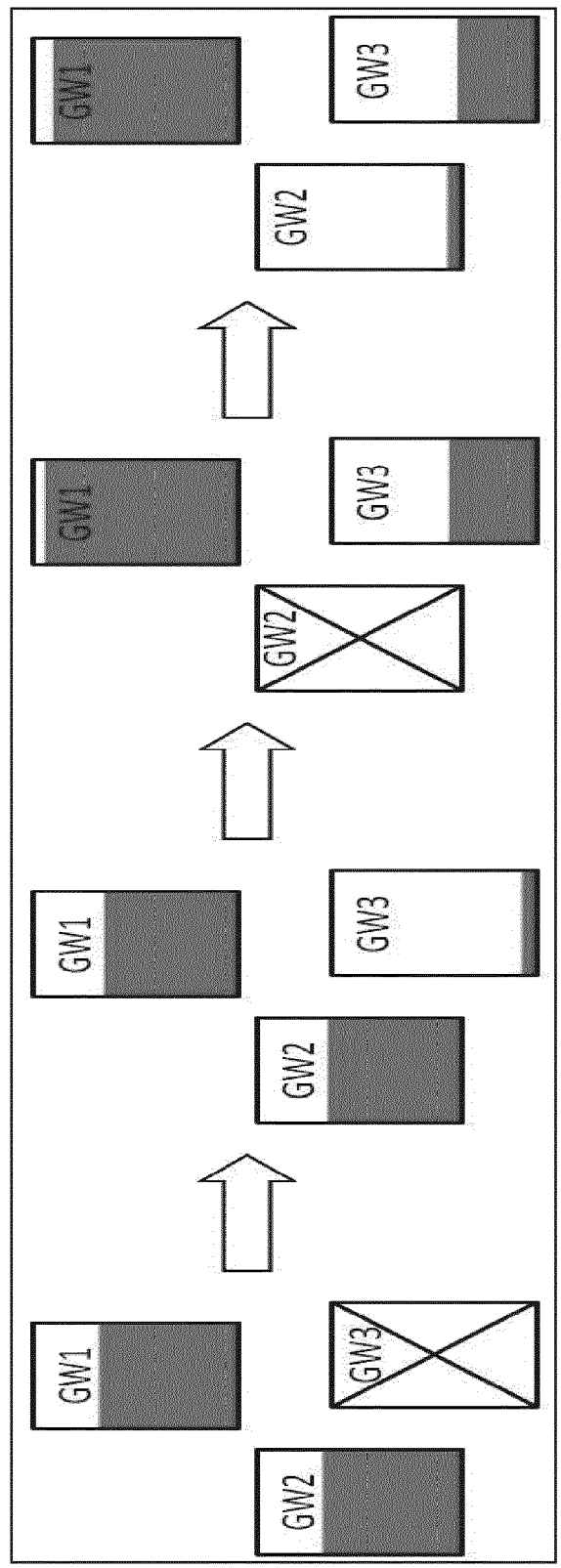
Figure 7:
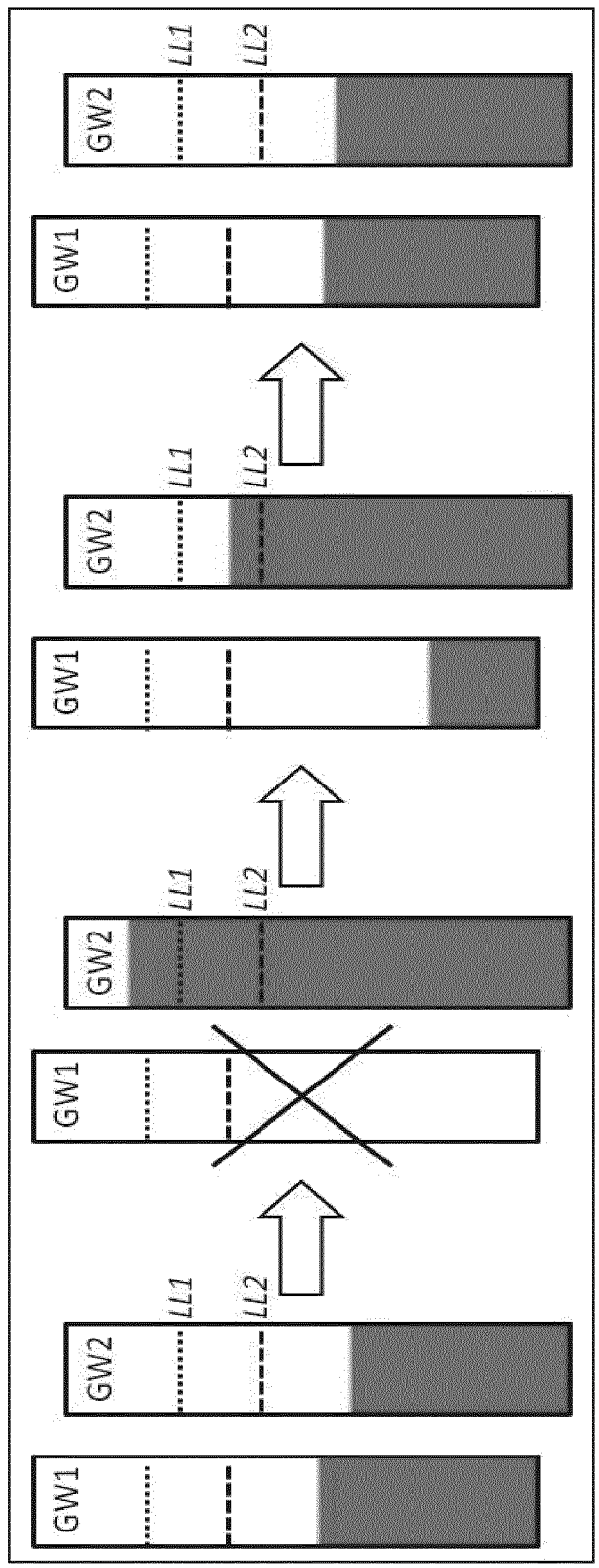
Figure 8:
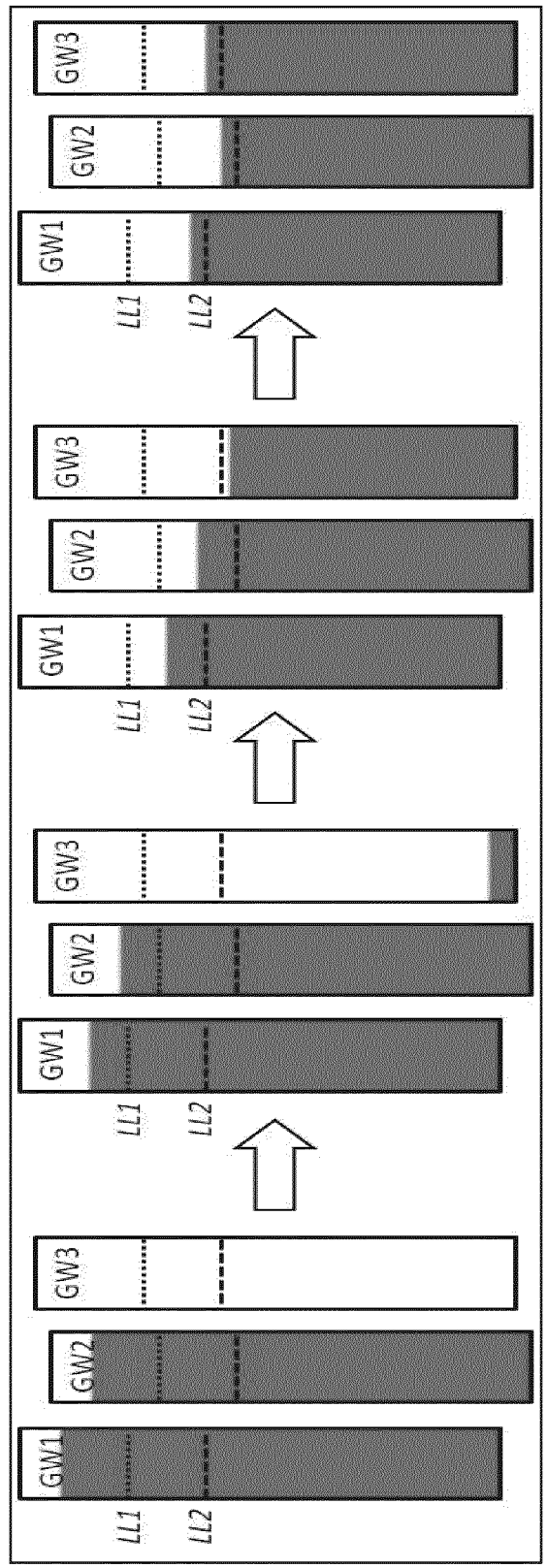
Figure 9:
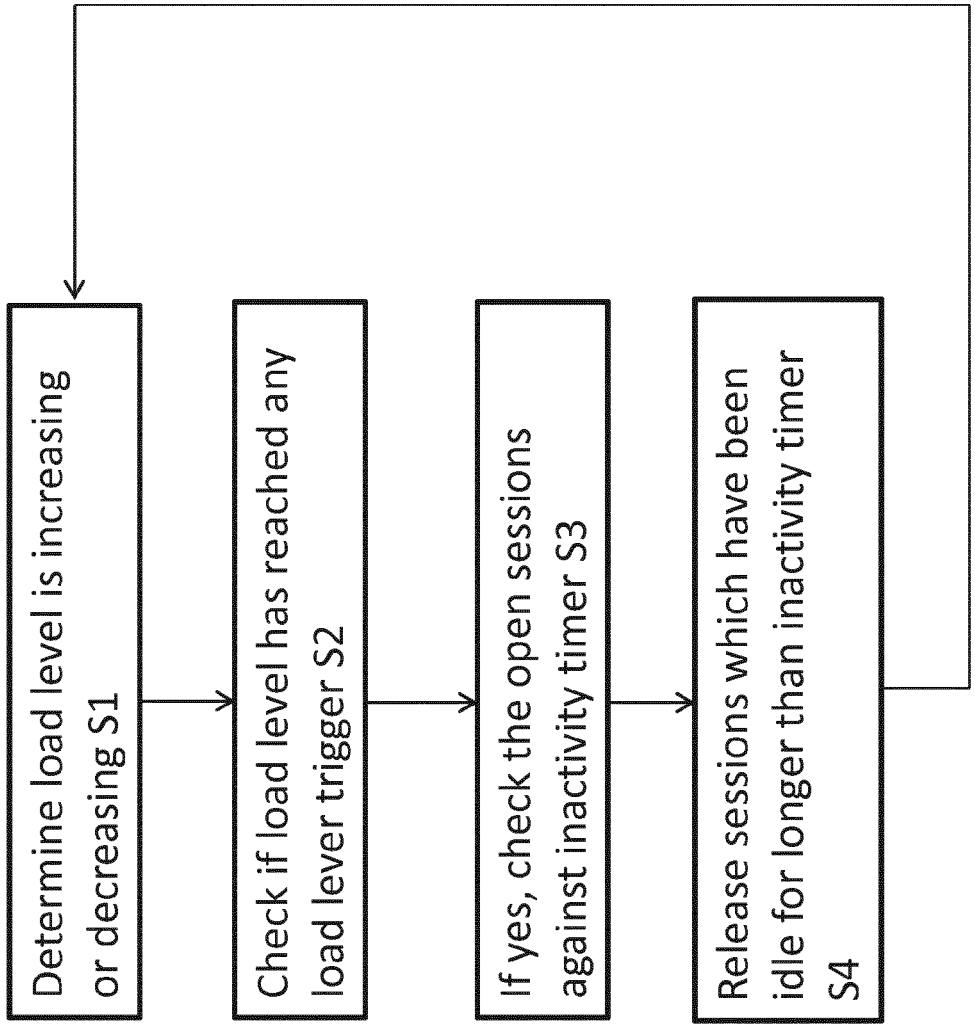

FIG. 4 schematically shows gateway load levels when one gateway is taken out of service;

FIG. 5 schematically shows gateway load levels when one gateway is put back to service;

FIG. 6 schematically shows gateway load levels when two gateways shut down one after the other;

FIG. 7 schematically shows gateway load balancing when a gateway is taken out of service and then goes back online;

FIG. 8 schematically shows gateway load balancing when a new gateway is added to a network; and FIG. 9 shows a method of an embodiment.

Figure 10:
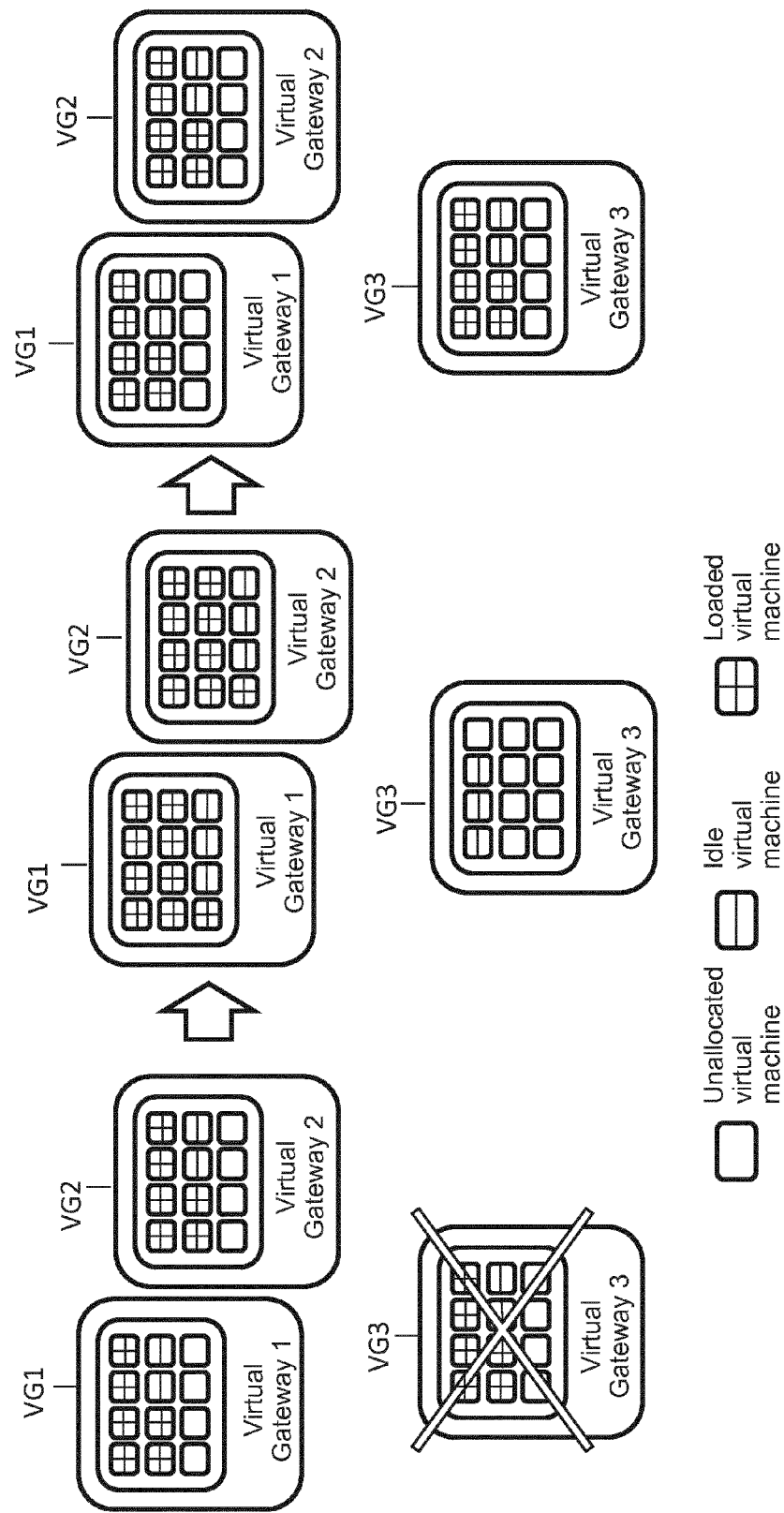

FIG. 10 shows an embodiment for balancing load in the virtualised cloud computing environment.

DETAILED DESCRIPTION

In the following certain exemplifying embodiments are explained with reference to a wireless or mobile communication system serving mobile communication devices. Before explaining in detail the exemplifying embodiments, certain general principles of a communication system and mobile communication devices are briefly explained with reference to FIGS. 1 to 3 to assist in understanding the technology underlying the described examples.

An example of wireless communication systems are architectures standardized by the 3rd Generation Partnership Project (3GPP). A latest 3GPP based development is often referred to as the long-term evolution (LTE) of the Universal Mobile Telecommunications System (UMTS) radio-access technology. The various development stages of the 3GPP LTE specifications are referred to as releases. More recent developments of the LTE are often referred to as LTE Advanced (LTE-A). The LTE employs a mobile architecture known as the Evolved Universal Terrestrial Radio Access Network (E-UTRAN).

In a wireless communication system mobile communication devices or user equipment (UE) 2 are provided wireless access via the antennas of at least one base station or similar wireless transmitting and/or receiving node or point.

Figure 1:
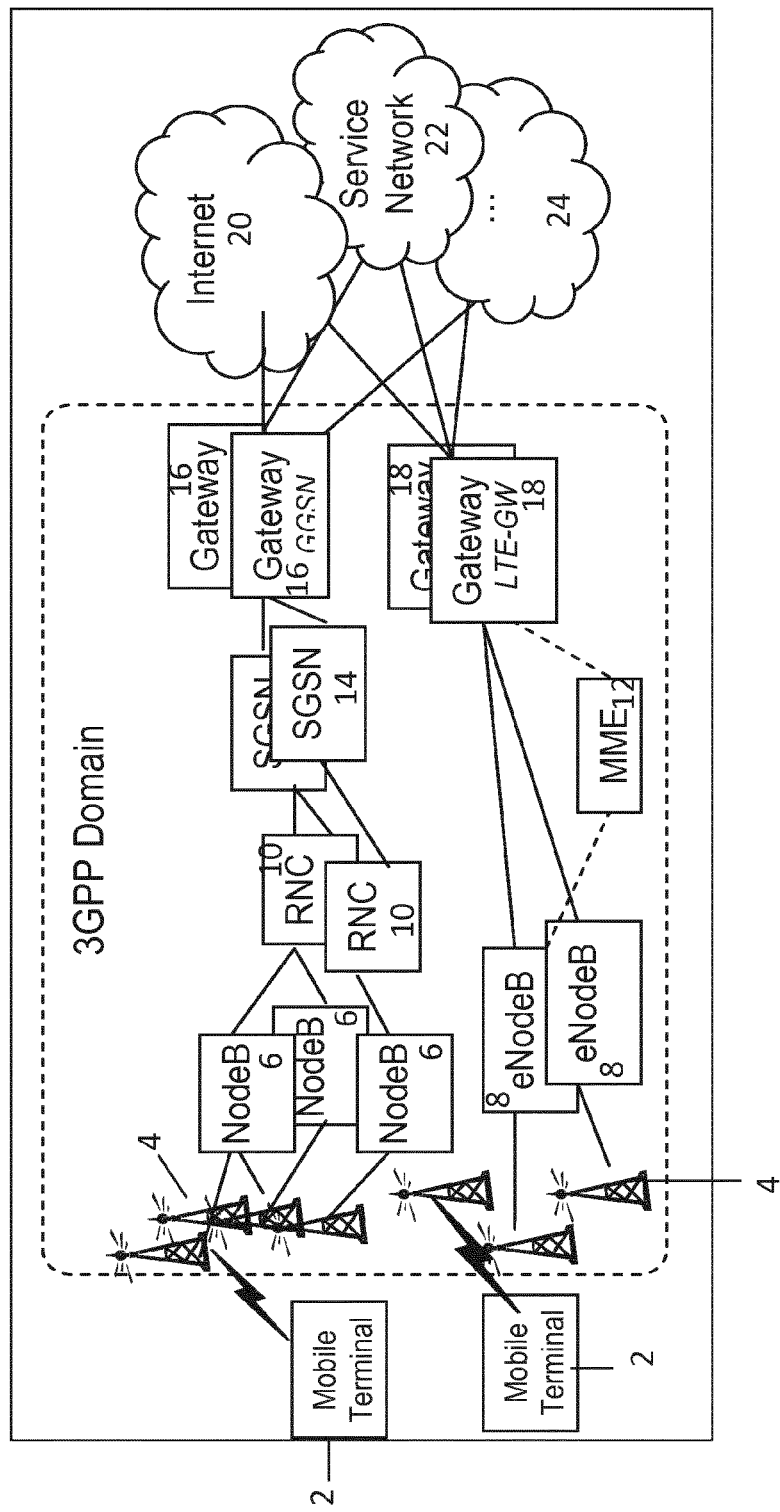
FIG. 1 shows a schematic diagram of a communication system.

In FIG. 1, the base stations are NodeBs 6 and eNodeBs 8. Other examples of access nodes include those provided by base stations of systems that are based on technologies such as wireless local area network (WLAN) and/or WiMax (Worldwide Interoperability for Microwave Access).

The NodeBs 6 are in communication with respective radio network controllers RNC 10. In the example shown in FIG. 1, two NodeBs are in communication with one RNC and another node B is in communication with a different RNC 10. The RNCs 10 are in communication with respective SGSN (serving GPRS (general packet radio service) support nodes) 14. Each of the SGSNs 14 is in communication with a respective gateway 16. These gateways are GGSNs (Gateway GPRS service node). The gateways are coupled to provide access to the Internet 20, a service network 22 and/or any other network 24.

The eNodeBs 8 are in communication with gateways 18. These gateways are LTE-GW. Again, the gateways 18 provide access to the Internet 20, service network 22 and/or any other suitable network 24. A MME 12 (mobile management entity) is provided which is in communication with the eNodeBs 8 and gateways 18. The MME is a control plane element, having a signaling interface towards the eNodeB and the gateway. The cellular network domain may be regarded as being provided by the antennas 4, the access points (NodeBs 6 and eNodeBs 8), the RNCs 10, the SGSN 14, the MME 12 and the gateways (GGSN 16 and LTE-GW 18). The cellular domain may be a 3GPP domain in some embodiments. The LTE-GW may be a SAE-GW (system architecture evolution gateway).

A possible mobile communication device will now be described in more detail with reference to FIG. 2 showing a schematic, partially sectioned view of a communication device 2. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 2 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO arrangements as such are known. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with TX antenna numbers or port numbers of MIMO arrangements.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus. The control apparatus 300 comprises at least one memory 301, at least one data processing unit 302, 303 and an input/output interface 304. Via the interface the control apparatus can be coupled to a receiver and/or transmit data. For example the control apparatus 300 can be configured to execute an appropriate software code to provide the control functions.

The communication devices 2 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

In a mobile network, the user sessions are established as tunnels between the UEs and gateways. The gateways are the aggregation points for the user sessions, providing the anchor towards the services in the Internet, operator service network and/or any other suitable network.

The number of gateway elements in an operator network ranges for example from two up to twenty or more. The number of gateways may depend on one or more of the size of the operator's subscriber base, redundancy requirements, site strategy, element capacity, and the like.

There is a trend towards higher aggregation capabilities for gateway elements. In some systems only a few gateway elements may be provided in some networks.

The user sessions may need to be distributed across the gateway elements. In a typical scenario, when a user session is established, the session control element makes a DNS (domain name system) query. The session control element may be SGSN in a 2G/3G network and a MME in a LTE network. The query returns the address of the gateway where the session is established.

The logic of balancing the sessions may be a simple round-robin (session are distributed evenly) or weighted round robin (some gateway elements have higher capacities and can host more sessions). Alternative methods also exist, such as selecting certain gateway(s) for certain subscribers, selecting the nearest gateway element and so on. Over time, the gateway elements are populated with sessions and their load levels follow the load balancing logic for session distribution. In a simplified scenario, sessions should be distributed evenly and each gateway has an equal amount of sessions to serve.

Some embodiments can be applied in systems such as discussed above or in any other scenario where similar load-balancing is applied. One example is the virtualization framework. In such a framework, tasks (such as sessions) would be performed in a cloud computing environment that internally has to balance load between the actual hardware resources.

Reference is made to FIG. 4, which shows three gateways GW1, GW2, and GW3. Initially all three gateways are in service and have relatively equal loads. One of the gateways GW3 is taken out of service. When a gateway element is taken out of service (for example for regular maintenance, network reconfiguration, software upgrade, hardware expansion or the like), or a gateway experiences a fault, the user sessions on that element need to be disconnected. In a typical maintenance scenario, the particular gateway is taken out from the load distribution (e.g. new sessions cannot be established to the gateway element), and the existing sessions are torn down. The remaining active Gateways start to serve these sessions once the sessions are re-established automatically by the UEs. Thus as shown in FIG. 4, once a gateway is taken out of service, the sessions are re-established to the remaining gateways, taking the whole network load. Thus in FIG. 4 the load is now shared between gateways GW1 and GW2.

Reference is made to FIG. 5 which shows the three gateways GW1 to GW3. Initially gateway GW3 is taken out of service. Then gateway GW3 is put back to service, and starts to take new sessions in. These new sessions are sessions that at first reside on the active gateways GW1 and GW2, and are now being re-established. Due to always-on sessions, session re-establishments may not occur very often. As shown in FIG. 5, the network load between the gateways starts to balance very slowly. In LTE, the users are always connected, and User initiated session disconnections are rare.

In the case of equal load-balancing, only every $N^{th}$ session (N being the number of active gateways and hence 3 in the example of FIG. 5) is established to the least loaded gateway. Sessions coming to the least loaded gateway, gateway GW3 in the example of FIG. 5 will also experience re-establishment. This may further delay the balance.

Without active operations, such as forcing sessions on the most loaded Gateway(s) to tear-down, or changing the weighting in the load balancing mechanism, the network load may theoretically never be balanced.

Mathematically:
N=number of elements e.g. gateways
S=total number of sessions
Si=number of sessions in an element
R=re-establishment rate (%)
Balanced situation=Si=S/N
Sessions established in an element at given time=(S*R)/N
Session disconnected from an element at given time=Si*R During a maintenance break, all the gateway elements may be typically shut-down one after another, for example for a software upgrade. This may further enforce the out-of-balance situation, as the last element(s) to be shut-down will experience even higher loads. Reference is made to FIG. 6. Initially, the third Gateway GW3 is taken out of service. The third Gateway GW3 is then bought back into service. At this point, the first and second gateways GW1 and GW 2 will have relatively high loads. The third Gateway GW3 will have a relatively low load. The second Gateway GW2 is then taken out of service. This results in the first Gateway GW1 having a relatively high load and the third Gateway GW3 having a moderate load. The second Gateway GW2 is then brought back in service. The second Gateway GW2 will have a relatively low load, the first Gateway GW1 a relatively high node and the third Gateway GW3 a moderate load.

An out-of-balance situation may alternatively or additionally occur when new elements are taken into service.

Network load can be balanced by manual intervention. For example, the load distribution algorithm may be temporarily changed using manual configuration and active monitoring of the element loads. Sessions may be forced to disconnect on the most loaded elements. This may affect an end of user experience if sessions are forced down while the services are used.

The speed of re-establishing sessions may be not effect too much an end user experience if an "inactivity timer" is used. Each end user session may be monitored if there is actually data transfer on-going. Once the session has been inactive for configurable amount of time, the gateway may force the session to disconnect (network initiated disconnect). This method has the drawback in that it applies regardless of if there is in-balanced situation in the network. Thus unnecessary signalling traffic may be created.

Some embodiments may provide a self-organizing and/or self-learning mechanism to release sessions on the most loaded elements. This may balance the network level loads more evenly. The mechanism may run independently inside each element. Some embodiments may not require any manual operations. Some embodiments may not require any extra entity to coordinate the load distribution between the elements.

Some embodiments may have a mechanism which uses one or more element load indicators. The load indicators may comprise one or more of CPU load, amount of sessions, and the like. Alternatively or additionally the mechanism may use one or more load-level triggers. The load level triggers may comprise one or more of percentage of maximum load and the like. The mechanism may alternatively or additionally use corresponding session inactivity timers.

When an element notices an abnormal increase or decrease in load level, this may be due to one or more other elements going out of service and/or put back to service. The element checks whether any load level trigger is exceeded, and if yes, checks all the sessions against a corresponding inactivity timer. Sessions considered to be idle (that is inactive for more than a given time) are released. The UEs re-establish released sessions, and the UEs are load balanced to all active elements. Should there be no change in the load level, the element determines there is no extra capacity in the network and the process stops. Should there be decrease in the load level, the element determines that there still is capacity available, and the element continues the load level trigger inspection.

In some embodiments, more than one load level trigger may be provided to enable the configuring of a more aggressive session release policy for higher load levels.

Reference is made to FIG. 7 which shows an embodiment where a gateway is taken down for maintenance and then brought back into service. Initially, both the first gateway GW1 and the second gateway GW2 are in service and the load is balanced between the two gateways.

Next, the first gateway GW1 is taken out of service. The second gateway GW2 will detect the increase in load, triggering inactive sessions to be disconnected. As shown in FIG. 7, each gateway is provided with a first higher threshold level LL1 and a second lower threshold level LL2. In the example of FIG. 7, the load initially goes above the higher threshold level LL1 in the second gateway GW2.

Next, the first gateway GW1 comes back into service. The second gateway GW determines that the load is decreasing. In particular, the load now falls below the first threshold LL1, but above the second threshold LL2. Inactive sessions continue to be disconnected but at a lower rate of disconnection.

This will cause the load to be stabilised. In particular, the load in the second gateway GW2 goes below the lower threshold LL2. The second gateway GW2 will then observe the load stabilising and the fact that the load is below both of the trigger thresholds. The second gateway GW2 will make a determination that the gateways are more balanced. The first gateway GW1 loads are below both threshold triggers and therefore takes no steps to rebalance load.

Reference is made to FIG. 8 which shows an example when a new gateway GW3 is added to the network. Initially, a first gateway GW1 and a second gateway GW2 are provided. Both of these gateways GW1 and GW2 are heavily loaded. In this example, the load exceeds the higher threshold LL1 in both the first gateway GW1 and the second gateway GW2.

A third gateway GW3 is then introduced. The third gateway GW3 will start to take on loads. The first and second gateways GW1 and GW2 will detect at the decrease in their load. This will cause the first and second gateways GW1 and GW2 to trigger the disconnection of the inactive sessions.

The loads in the first and second gateways GW1 and GW2 fall below the higher threshold LL1, but are still above the lower threshold LL2. As the first and second gateways GW1 and GW2 still see their loads decreasing, the inactive sessions continue to be disconnected but at a lower rate than previously.

Finally, the first and second gateways GW1 and GW2 see their loads stabilising. Accordingly, inactive sessions are no longer disconnected. The third gateway node GW3 is stabilised at the same time and the third gateway monitors its load.

Reference is now made to FIG. 9 which shows a method of some embodiments. The method may be carried out in an element such as a gateway. The method may be implemented by for example an algorithm. The method may be as follows:

In step S1, is noticed that the load level (L) on an element starts to increase ($\Delta L>0$) or decrease ($\Delta L<0$). This may be due to one or more other element(s) going out of service, and/or one or more new elements being put to service. It may be determined that there is an increase or decrease if the change in load over a given period of time exceeds a minimum value.

In step S2, it is checked whether any of one or more load-level triggers ($LL_i$) are reached ($L>LL_i$).

In step S3, if the load is above any load level trigger value, all the open sessions in the element are checked against the corresponding inactivity timer ($T_i$) associated with the highest load level trigger which has been reached.

In step S4, any session that has been idle longer than the inactivity timer period is released for re-establishment and load balancing.

The method will repeat. In other words, the method reverts to step S1 of the method to determine if there is still is a change in load level. If the load level is stable, it can be assumed that the network, load is relatively evenly distributed.

The method may be performed by the control apparatus shown in FIG. 3.

Because the load level may depend on the time of the day, the algorithm can be run always at certain time.

The load level changes may be monitored against the previously experienced levels, to exclude the effect of the daily variations.

Load levels may also increase over time due more subscribers using terminals. However this is a slower pace of increase which may be ignored by the system.

Some embodiments may provide one or more of the following advantages. No manual operations may be required. The method may balance both when adding a new element or removing an element. The capacities of one or more elements can be different. The weights used in the load distribution can be different in different elements.

It should be appreciated that in embodiments described, two different threshold levels have been shown. It should be appreciated that in alternative embodiments, only a single threshold level may be provided. Alternatively, more than two different threshold levels may be provided.

In some embodiments, the rate at which inactive sessions are disconnected is dependent on the load. In particular, the higher the loading, the higher the rate of disconnection of inactive sessions. It should be appreciated that in alternative embodiments, a more even rate of disconnection of inactive sessions may be used.

In some embodiments, the length of the inactivity timer which is used to define an inactive session may be dependent on the load level. For example, the inactivity time length may be tied to particular load level triggers. In other embodiments, a single inactivity timer length may be used, regardless of the loading in the element.

In some embodiments, one or more elements may have different thresholds as compared to each other. The number of thresholds may differ and/or the level of the thresholds. The capacity of one or more elements may differ from one or more other elements. The inactivity timer(s) may be different between two or more elements.

The session may be a computing session.

Some embodiments may be used to balancing load inside a virtualized cloud computing environment.

Reference is made to FIG. 10 which shows an embodiment for balancing load in the virtualised cloud computing environment. Initially, a first virtual gateway VG1 and a second virtual gateway VG2 are kept in service whilst a third virtual gateway VG3 is taken out of service. Initially, the first virtual gateway VG1 has four unallocated virtual machines, two idle virtual machines and six loaded virtual machines. The second gateway VG2 has the same allocation of unallocated virtual machines, idle virtual machines and loaded virtual machines.

The third gateway VG3 is then brought back into service. The first and second virtual gateways VG1 and 2 will have nine loaded virtual machines and three idle virtual machines. This is because the first and second virtual gateways VG1 and VG2 have had to take up the load of the virtual gateway VG3 which had been taken out of service. Initially, the third virtual gateway VG3 will have three idle virtual machines and nine unallocated virtual machines.

Using the same mechanism as described previously, the three virtual gateways VG1, VG2 and VG3 will be brought back into balance with each of the gateways having six loaded virtual machines, two idle virtual machines and four unallocated virtual machines.

The mechanism for achieving balance is, as previously described. Thus, the first and second virtual gateways VG1 and 2 will notice their load decreasing as the third virtual gateway VG3 comes back into service. The virtual machines which have been inactive for a given amount of time will be released. Thus, the process of FIG. 9 is carried out in relation to the arrangement of FIG. 10 until the gateways are balanced.

It should be appreciated that the number of unallocated virtual machines, idle virtual machines and loaded virtual machines given in FIG. 10 is by way of example only. The number of available machines in a virtual gateway may of course differ from the example shown in FIG. 10. Also, it should be appreciated that in some embodiments, the different virtual gateways may have different capacity.

Thus embodiments may be applied to any other suitable computing environment with a plurality of resources where tasks are provided across the resources and should be load-balanced and the tasks can be active or in-active.

The required data processing apparatus and functions of a controller apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method for load balancing between a plurality of gateway elements in a communication system, the method being performed by a control apparatus in the communication system, the method comprising:
   determining, in one gateway element of the plurality of gateway elements, that a network load level in the gateway element has changed; and
   deactivating, at the one gateway element, at least one inactive user session when the network load level is above a threshold of the network load level.

2. A method as claimed in claim 1, comprising determining, at the one gateway element, if the network load level exceeds a network load level trigger.

3. A method as claimed in claim 2, wherein a plurality of network load level triggers are provided.

4. A method as claimed in claim 3, wherein the determining of which of the plurality of user sessions are inactive comprises determining that the user session is inactive if the user session has been inactive for longer than a given time.

5. A method as claimed in claim 4, wherein the given time is dependent on the network load level in the one gateway element.

6. A method as claimed in claim 4, wherein the given time is dependent on a higher or highest of the network load level triggers which has been exceeded.

7. A method as claimed in claim 3, wherein the deactivating comprises deactivating the inactive user sessions at a rate which is dependent on the network load level.

8. A method as claimed in claim 7, wherein the rate of deactivating the inactive user sessions is dependent on the higher or highest of the network load level triggers which has been exceeded.

9. A method as claimed in claim 1, comprising determining, at the one gateway element, which of a plurality of user sessions are inactive.

10. A computer program product embodied in a non-transitory computer-readable medium and encoding instructions that, when executed in hardware, perform a process according to the method of claim 1.

11. An apparatus comprising:
    at least one processor; and
    at least one memory including computer code for one or more programs,
    wherein the at least one memory and the computer code are configured, with the at least one processor, to cause the apparatus at least to:
    determine in one gateway element that a network load level in the one gateway element has changed; and
    deactivate, at the one gateway element, at least one inactive user session when the network load level is above a threshold of the network load level.

12. An apparatus as claimed in claim 11, wherein the at least one memory and the computer code are configured, with the at least one processor, to cause the apparatus to determine, at the one gateway element, if the network load level exceeds a network load level trigger.

13. An apparatus as claimed in claim 12, wherein a plurality of network load level triggers may be provided.

14. An apparatus as claimed in claim 13, wherein the at least one memory and the computer code are configured, with the at least one processor, to cause the apparatus to determine that the user session is inactive if the user session has been inactive for longer than a given time.

15. An apparatus as claimed in claim 14, wherein the given time is dependent on the network load level in the one gateway element.

16. An apparatus as claimed in claim 14, wherein the given time is dependent on a higher or highest of the network load level triggers which has been exceeded.

17. An apparatus as claimed in claim 11, wherein the at least one memory and the computer code are configured, with the at least one processor, to cause the apparatus to determine which of a plurality of user sessions are inactive.

18. An apparatus as claimed in claim 11, wherein the at least one memory and the computer code are configured, with the at least one processor, to cause the apparatus to deactivate the inactive user sessions at a rate which is dependent on the network load level.

19. An apparatus as claimed in claim 18, wherein the rate of deactivating the inactive user sessions is dependent on the higher or highest of the network load level triggers which has been exceeded.

* * * * *